March 22, 1955  H. R. HARDING  2,704,676
RING SEALER
Filed Jan. 24, 1952

INVENTOR.
HIRAM R. HARDING.
By Howard J. Whelan.
ATTORNEY.

United States Patent Office 2,704,676
Patented Mar. 22, 1955

2,704,676

RING SEALER

Hiram R. Harding, Baltimore, Md., assignor of fifty per cent to Harry E. Karr, Baltimore County, Md., and twenty-five per cent to Logan C. Harding, Hopewell, Va.

Application January 24, 1952, Serial No. 268,086

3 Claims. (Cl. 285—55)

This invention relates to sealing devices and more particularly to those used for sealing screw threads against leakage.

In pipe and tube fittings especially those used for high pressure oil and gas lines and the like, the leakage of the medium between the threads has been considerable. The threads have been coated with various mixtures that hardened and cracked, allowing the medium to pass through the cracks. Various devices have been tried out for attachment to the fittings, but none of them have been capable of working on jet engines and other devices where the change in temperatures range from extremely high to very low temperatures.

It is therefore an object of this invention to provide a new and improved ring thread sealer for attachment to a threaded surface which will prevent leakage between its threads and the threads of the article it is screwed into and to act as a resilient support to take the strain off the screwed part.

It is a further object of this invention to provide a new and improved ring seal which will automatically expand and contract to suit variations in diameter of the article to which it is attached.

It is a further object of this invention to provide a new and improved ring sealer having a projecting form for attachment to threaded surfaces, having a hole at its top which will decrease in diameter as the height of the projection is decreased.

It is a further object of this invention to provide a new and improved ring sealer having a projecting form for attachment to threaded surfaces, having a hole at its top which will decrease in diameter as the height of the projection is decreased.

It is a further object of this invention to produce a flat ring sealer having a hole in its center of smaller diameter than the object it is to be placed on, forming the flat sealer into a projecting shape of sufficient projection to increase the diameter of said small hole to slidably fit over the object it is to be used with, then to have said hole decreased in size to tightly fit around the object to which it is attached.

A further object of this invention is to provide a non-collapsible ring sealer having projecting angular walls with a hole at its smaller end that is slightly larger than the object it is to be used with and a seal contacting member operable on said object and having a seal contacting surface of approximately the same angle as the projecting angular walls of said seal member so it will compress inwardly the small hole at the top of said sealer without collapsing said sealer from its angular form.

A further object of this invention is to provide a sealer and pressing member of sufficient angle to prevent the sealer from collapsing when pressed on by said pressing member.

Other objects will become apparent as the invention is more fully set forth.

For a clearer understanding of the invention and the objects thereof, reference is made to the accompanying drawings, wherein a particular form of the invention is indicated. These drawings when used in conjunction with the following description serve to illustrate the invention, its principles and the operation thereof, while the claims indicate the scope thereof.

In the drawings.

Similar reference characters refer to similar parts throughout the drawings.

Figure 1:
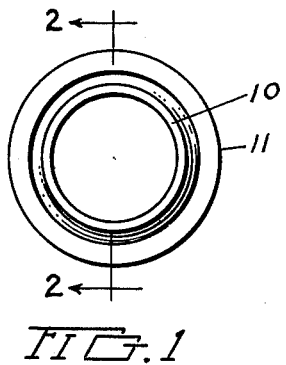
Figure 1 is a front elevation of the ring sealer embodying this invention.
Figure 2:
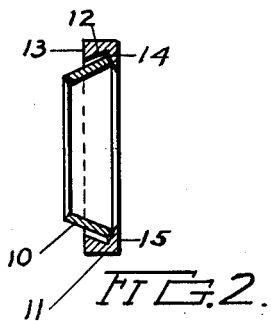
Figure 2 is a sectional view taken along line 2—2 of Figure 1.

In the construction shown in the drawings a projecting or conical sealing ring member 10 is inserted in a retaining ring member 11 and held therein. The retaining ring 11 is preferably provided with a front angular face 12 positioned at approximately fifteen degrees from the front face 13 of the ring member 11. The rear angular face 14 is set at approximately 35 degrees from the rear wall 15 and forms therewith an opening larger in diameter than the overall diameter of the threaded object it is to be used with so the ring can be slid over the threaded object. The opening in the front wall 13 of the ring 11 is larger in diameter than the hole shown in its rear wall 15, but it is slightly smaller than the largest diameter of the projecting ring member 10, and when the large end of the projection member is forced into the opening in the face 13 it will spring and decrease in diameter until it passes the edge and then expand against the angular face 12 and be retained therein against separation from the ring member 11.

Figure 3:
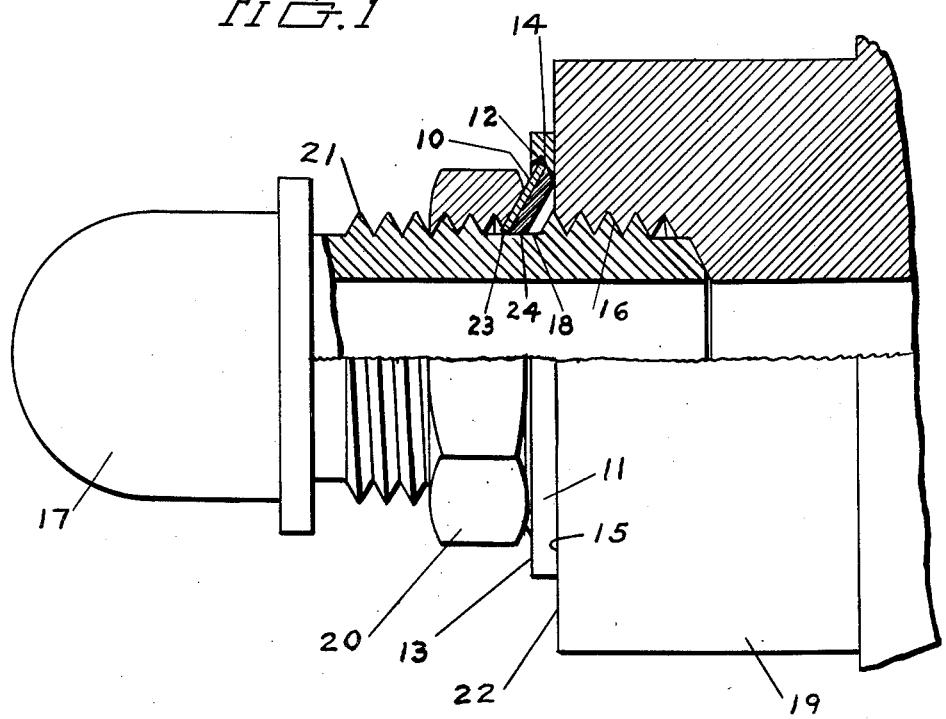
Figure 3 is an enlarged view of the ring sealer and liner positioned on a threaded fitting attached to a portion of a machine, to show a method used for compressing the height of the projecting ring sealer to make a leak proof seal at both of its ends.

The ring seal is slid over the threads 16 on the object or fitting 17 it is to be used with until it reaches the undercut 18 which is approximately the same diameter as the root diameter of the thread. The fitting is then screwed into the device 19 it is to be used with, and the locking nut 20 is then rotated on the threads 21 to contact the front end of the member 10 and force the ring 11 against the face 22 of the device 19, further tightening of the nut 20 on the threads 21 forces the front end 23 of the conical or projection member to be resiliently compressed against the face of the undercut 18 to form a tight seal therebetween and prevent leakage therethrough. It can be readily appreciated that the resilient conical member 10 as shown in Figure 3 provides a resilient member that will expand or contract with the changes in diameter of the unit it is fitted to without allowing the medium to escape and also provides a leak-proof joint at the stud and device. In some installations where angular faces are contacted by the inner wall of the conical member 10 it has been found advisable when the contacting surface of the angular face is rough or scored, to use a liner 24 of any material suitable for use under the conditions encountered in that specific case.

"Teflon" a product manufactured by the Dupont Company is presently used for the purpose with very satisfactory results.

The conical member is preferably formed from a flat washer and bent or formed into a conical or projecting shape, as noted in the drawings. If a conical sealing ring 10 was to be used on a one-half inch diameter stud, a flat washer having a hole .422 inch in diameter is selected, the washer is bent into a conical form until the hole is enlarged to .503 inch, the conical washer is now called a sealing ring and is slid over the stud or fitting it is to be used with until it reaches the undercut portion of the fitting which has a diameter of .427 which is approximately the diameter of the root of the thread on a ½" 20 thread stud. The nut 20 compresses the hole tightly around the stud .427.

Figure 4:
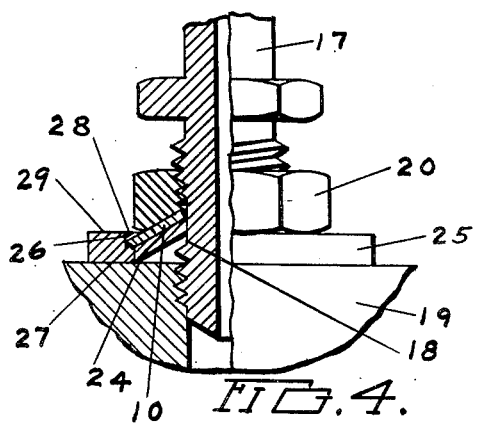
Figure 4 shows a modified form of retaining ring used with this invention.

A modified form of retaining ring 25 is shown in Figure 4 and is provided with a straight face hole 26 and shelf 27. The diameter of the straight face hole 26 if slightly larger than the largest diameter of the sealing ring member 10 which is placed on the shelf 27 and peen point 28 are forced into the face 29 of the retaining ring 25 to prevent the sealing ring member 10 from turning and falling out of the ring 25. The use of the retaining ring 25 may be eliminated by counterboring a hole having straight walls directly in the device 19, the sealing ring is to be used with, peening or prick punching the edge of the hole to hold ring 10, screwing the fitting into the device, tightening the nut 20 against the sealing ring 10 and screwing it down to expand the ring 10 and liner 24.

While but two general forms of the invention are shown in the drawings and described in the specification, it is not desired to limit this application for patent to these particular forms, as it is appreciated that other forms of construction could be made that would use the same principles and come within the scope of the appended claims.

Having thus described the invention what is claimed is:

1. A sealing device for a threaded bolt having a smooth cylindrical portion between its threads, and an element into which the bolt is threadable, said device comprising an annular retaining ring about the bolt resting on the element and having an upper and a lower face and also having an upper and a lower internal circular surface, said surfaces being angularly disposed with respect to each other, the upper surface tapering outwardly and downwardly from the upper face of the retaining ring to its junction with the lower internal surface, said lower internal surface thence tapering inwardly and downwardly to the lower face of the ring, a truncated-cone shaped sealing ring, having continuous solid walls, about the bolt having upper and lower substantially parallel faces, the upper face having its inner edge slidably engaging the smooth cylindrical portion on the bolt and the lower face normally resting on the lower surface of the retaining ring with its conical walls spaced from the upper surface of the retaining ring, and a nut threaded on the bolt and having an internal conical recess engageable with the upper wall of the sealing ring, the upper surface of the sealing ring extending above the upper face of the retaining ring a distance greater than the depth of the recess in the nut, whereby screwing of the nut compresses the sealing ring forcing the lower edge of its upper conical wall against the upper internal surface of the retaining ring and the inner edge of the upper surface of the sealing ring against the smooth cylindrical portion of the bolt to form a tight seal.

2. A sealing device as set forth in claim 1 including a liner beneath and paralleling the aforesaid sealing ring, said liner being co-extensive with the sealing ring in order to protect the latter.

3. A sealing ring device as set forth in claim 1, wherein the upper internal surface of the retaining ring is a semi-circular surface recess and wherein the lower internal surface thereof is a straight-sided circular surface.

References Cited in the file of this patent

UNITED STATES PATENTS

| 83,213 | Sanders | Oct. 20, 1868 |
| 560,042 | Mills | May 12, 1896 |
| 583,451 | Brady | June 1, 1897 |
| 996,133 | Peters | June 27, 1911 |
| 1,031,528 | Cole | July 2, 1912 |
| 1,320,259 | Martens | Oct. 28, 1919 |
| 1,795,570 | Nilson | Mar. 10, 1931 |
| 2,001,645 | Abell | May 14, 1935 |
| 2,455,982 | Dowty | Dec. 14, 1948 |

FOREIGN PATENTS

| 891,650 | France | Dec. 11, 1943 |